United States Patent
Lutzka et al.

(10) Patent No.: US 9,290,115 B2
(45) Date of Patent: Mar. 22, 2016

(54) SEAT ASSEMBLY WITH MOVEABLE SEATBACK

(71) Applicant: BAE Industries, Inc., Warren, MI (US)

(72) Inventors: Tavis Lutzka, Davisburg, MI (US); Jason Hamilton, Highland, MI (US)

(73) Assignee: BAE Industries, Inc., Auburn Hills, MI (US)

( * ) Notice: Subject to any disclaimer, the term of this patent is extended or adjusted under 35 U.S.C. 154(b) by 0 days.

(21) Appl. No.: 14/476,303

(22) Filed: Sep. 3, 2014

(65) Prior Publication Data

US 2015/0069806 A1    Mar. 12, 2015

Related U.S. Application Data

(60) Provisional application No. 61/875,877, filed on Sep. 10, 2013.

(51) Int. Cl.
    *B60N 2/22*    (2006.01)
    *B60N 2/36*    (2006.01)
    *B60N 2/30*    (2006.01)
    *B60N 2/02*    (2006.01)

(52) U.S. Cl.
    CPC ............ *B60N 2/36* (2013.01); *B60N 2/3065* (2013.01); *B60N 2002/024* (2013.01)

(58) Field of Classification Search
    CPC ............ B60N 2/10; B60N 2/235; B60N 2/32; B60N 2/22; B60N 2/20; B60N 2/02; B60N 2/0232
    USPC .......... 297/331, 334, 378.11, 378.12, 378.14, 297/330, 344.1, 378.1; 296/65.01, 65.16, 296/65.17, 65.18
    See application file for complete search history.

(56) References Cited

U.S. PATENT DOCUMENTS

| | | | |
|---|---|---|---|
| 6,612,653 B2 | 9/2003 | Takata | |
| 6,655,741 B2 | 12/2003 | Bonk | |
| 6,726,283 B2 | 4/2004 | Schambre et al. | |
| 6,764,136 B2 | 7/2004 | Sakamoto | |
| 6,971,720 B2 | 12/2005 | Bonk | |
| 7,040,684 B2 * | 5/2006 | Tame et al. ............. | 296/65.09 |

(Continued)

FOREIGN PATENT DOCUMENTS

| | | | | |
|---|---|---|---|---|
| JP | 2007083777 A | * | 4/2007 | |
| WO | 2006095108 A1 | | 9/2006 | |
| WO | WO 2006095108 A1 | * | 9/2006 | ........... B60R 22/22 |

*Primary Examiner* — Beth Stephan
(74) *Attorney, Agent, or Firm* — Dinsmore & Shohl LLP; Douglas J. McEvoy

(57) ABSTRACT

A seat assembly having stanchions secured to a floor of a vehicle interior, a seatback pivotally secured between the stanchions. A seat bottom has an arm extending therefrom which is pivotally engaged to the seatback at a location offset from the seatback pivot with the stanchions. The seat bottom is pivotally connected at forward locations by a linkages extending to additional floor locations such that pivoting of the seatback results in slaved pivoting and combined displacement of the seat bottom between upright design and forward folded positions. A motor is pivotally secured to the vehicle interior, a rotatable screw extending from the motor and supporting an interiorly threaded collar in length displaceable fashion along the screw. A support arm is pivotally secured to the floor and to the screw supported collar. The support arm responds to actuation of the motor in at least a rewind direction in order to upwardly displace the seat bottom and slaved seatback to the upright design position.

20 Claims, 21 Drawing Sheets

(56) References Cited

U.S. PATENT DOCUMENTS

| | | | |
|---|---|---|---|
| 7,188,904 B2 | 3/2007 | Bruck et al. | |
| 7,387,333 B2 * | 6/2008 | Seibold | 297/15 |
| 7,517,022 B2 * | 4/2009 | Habedank et al. | 297/378.12 |
| 7,775,594 B2 | 8/2010 | Bruck et al. | |
| 8,038,198 B2 * | 10/2011 | Yamagishi | 296/90 |
| 8,226,167 B2 | 7/2012 | Bruck et al. | |
| 8,360,497 B2 * | 1/2013 | Kokubo et al. | 296/65.09 |
| 8,746,773 B2 * | 6/2014 | Bruck | 296/65.17 |
| 8,864,210 B2 * | 10/2014 | Bruck | 296/65.18 |
| 2003/0189371 A1 | 10/2003 | Collins | |
| 2006/0131946 A1 | 6/2006 | Andrigo et al. | |
| 2006/0255637 A1 * | 11/2006 | O'Connor | 297/331 |
| 2006/0273645 A1 * | 12/2006 | Ferrari et al. | 297/336 |
| 2008/0164740 A1 * | 7/2008 | Harper et al. | 297/331 |
| 2008/0252126 A1 * | 10/2008 | Bartoi et al. | 297/341 |
| 2009/0322137 A1 | 12/2009 | Kojima et al. | |
| 2011/0037304 A1 * | 2/2011 | Kammerer | 297/340 |
| 2013/0189371 A1 | 7/2013 | Lamberti et at. | |
| 2014/0062156 A1 * | 3/2014 | Bruck | 297/362.11 |

* cited by examiner

SEAT ASSEMBLY WITH MOVEABLE SEATBACK

CROSS REFERENCE TO RELATED APPLICATIONS

The present application claims the benefit of U.S. Provisional Application 61/875,877 filed Sep. 10, 2013, the contents of which are incorporated herein in its entirety.

FIELD OF THE INVENTION

The present application relates generally to a vehicle seat dump and return mechanism. More specifically, the present invention discloses a seat and associated latch assembly incorporating each of power-up/power-down and manual triggered forward dump variants of a pivoting seatback and linkage connected/collapsible seat bottom.

In each variant, a motor with bi-directional screw drive is mounted upon a floor plate extending across an underside of the seat, between the supporting stanchions. In the power-up/power-down variant, the motor and associated linkage controls both up/down motion of the seatback.

In the manual dump and power rewind variants, the motor can be employed in a first non-supporting position for triggering a separate cable release and forward spring biased dump of the seatback, following which a linkage supporting arm pivotally associated with the motor linkage forcibly upwardly displaces the seat bottom and linkage connected seatback to the upright return (design) position. The motor rewind function further integrates a sensor which is tripped upon detecting an obstruction in the path of the upwardly actuating seatback and which responds by back driving the motor to return the seat to the folded/dump position.

BACKGROUND OF THE INVENTION

The prior art is documented with examples of seat latch assemblies for providing forward seat back dump and reverse retraction to an upright design position. Representative examples of such assemblies include each of the powered seat assembly with motor depicted in U.S. Pat. No. 7,188,904, the power seat assembly with motor actuated spring release and seatback rewind of U.S. Pat. No. 7,775,594, and the linear recliner seat assembly with threaded linear drive rod and rotatably engaged gear stop of U.S. Pat. No. 8,226,167, all issued to Bruck et al. Additional references of note include each of US 2014/0062156 and U.S. Pat. No. 8,746,773, both to Bruck, and disclosing seat latch assemblies having manual seat dump and powered rewind and reset mechanisms.

SUMMARY OF THE PRESENT INVENTION

The present invention discloses a seat and associated latch assembly incorporating both power-up/power-down and manual triggered forward dump and power assisted rewind variants of a seatback and linkage connected/collapsible seat bottom. An electric motor with pivotal driving mechanism, this including a rotating screw supporting a bi-directionally displaceable collar and an associated linkage, is provided and is mounted to a floor plate extending across an underside of the seat between the stanchions.

In the power-up/power-down variant, the motor and associated linkage controls both up/down motion of the seatback, via a drive arm pivotally connected between the bi-directionally displaceable collar and a further pivotal location associated with a rear end of the seat bottom which in turn pivotally controls pivoting of the seatback. In one non-limiting configuration, a rigid elongated support is fixed to the seat bottom in extending fashion between the upwardly extending stanchions, the support being pivotally mounted to a location of the seat back frame above the main seatback pivot in order to translate forward/downward and reverse upward/rearward motion of the seat bottom, via the motor and pivoting linkage, to resultant forward and reverse pivoting of the linkage controlled seatback.

In the manual dump and power rewind variants, the drive arm pivotally supported by the displaceable collar is not slaved to or in contact with the seat bottom during an initial (separately) triggered release and dump protocol associated with the spring loaded seatback and linkage interconnected seat bottom. In one non-limiting application, a displaceable cable extends from a first end in contact with a release lever engaging the spring biased seatback in the design position, a second end of the cable extending in engagement with a pivot plate or pawl component associated with the displaceable collar.

Actuation of the motor screw in a first outward displacing direction creates pivotal triggering of the lever to and forward spring biased dump of the seatback, following which a linkage supporting arm pivotally associated with the motor linkage forcibly upwardly displaces the seat bottom and linkage connected seatback to the upright return (design) position. The motor rewind function further integrates a sensor which is tripped upon detecting an obstruction in the path of the upwardly actuating seatback and which responds by back driving the motor to return the seat to the folded/dump position.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
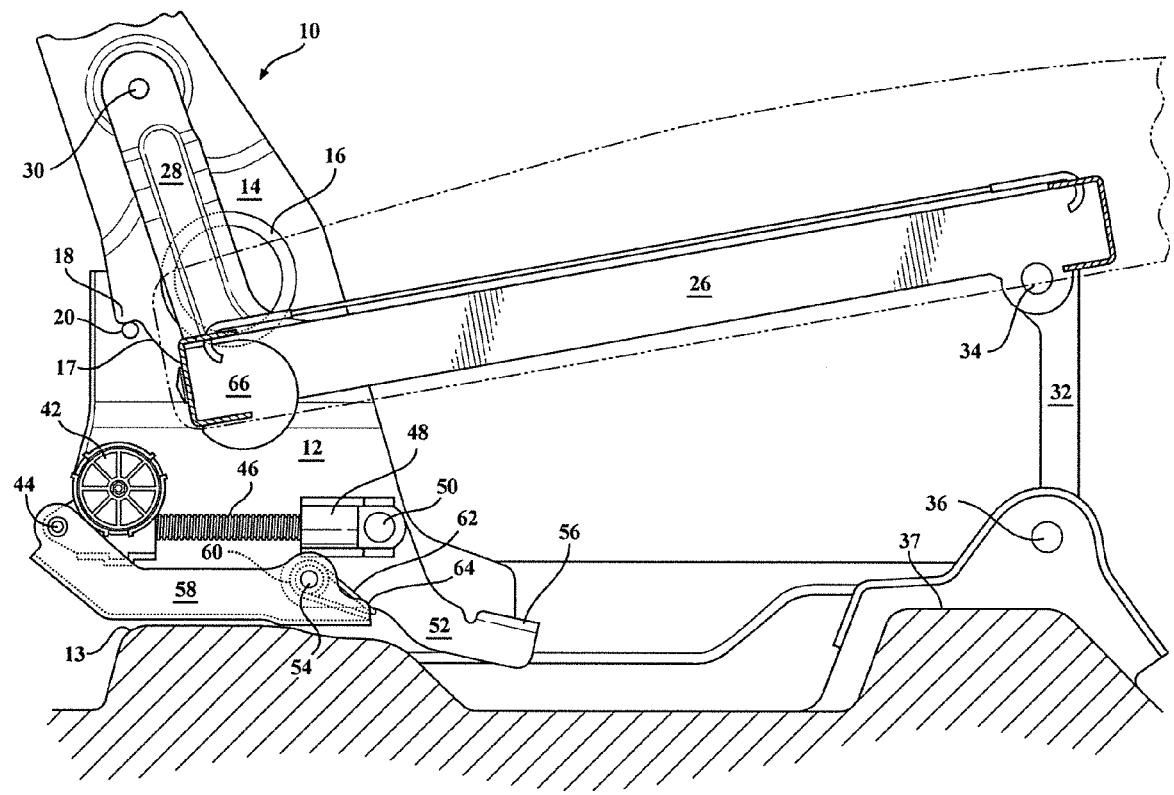
FIG. 1 is a plan view of a seat assembly according to a first embodiment incorporating the latch mechanism in an upright design position.

Referring to FIGS. 1-5 in succession, a first non-limiting variant is shown of a seat assembly (generally at 10 in FIG. 1) for providing manual triggering and subsequent powered rewinding of a seatback and linkage interconnected seat bottom. As will also be further described, succeeding variants are shown by each of the power-up/power-down embodiment of FIGS. 6-9 (this establishing continuous linkage driving contact established between the drive motor and seat bottom and pivotal seatback), as well as in each of FIGS. 10-15 and FIGS. 16-21 (both depicting additional examples of manual dump and power rewind assemblies). Without limitation, the seat assembly can include application to a variety of different vehicles, not limited to a second or third rear row of a sport utility vehicle.

With reference again to the succession of plan views depicted in each of FIGS. 1-5, a selected (right side) vertical support stanchion 12 is shown and which can be secured (such as via heavy duty fasteners) to a floor location 13 of a vehicle. As is known, a standard seat assembly includes a pair of spaced apart stanchions which upwardly extend from the floor of the vehicle passenger compartment, between which is pivotally supported the vehicle seatback. As will be also described with reference to the succeeding embodiments, one non-limiting advantage of the present invention is the ability to install the necessary power providing components (e.g. electric motor with rotatable/pivotal screw worm drive and linearly displaceable collar) and corresponding linkages associated with the seatback and seat bottom, this without the necessity of retrofitting or replacing the seat support stanchions.

The seat back is depicted along one vertically extending side by an arm 14, typically a steel or other metal stamping with a relatively thin body which is pivotally supported at a lower end to an upper location of the stanchion 12, this designated as a main pivot 16. In a typical installation, a pair of arms 14 (the second or left sided of which is hidden from view) are provided in coaxially and pivotally secured fashion to a pair of spaced apart inboard and outboard located stanchions defining a floor mount for a vehicle seat. The extending arms define sides of a seatback frame supporting a seatback cushion.

Figure 2:
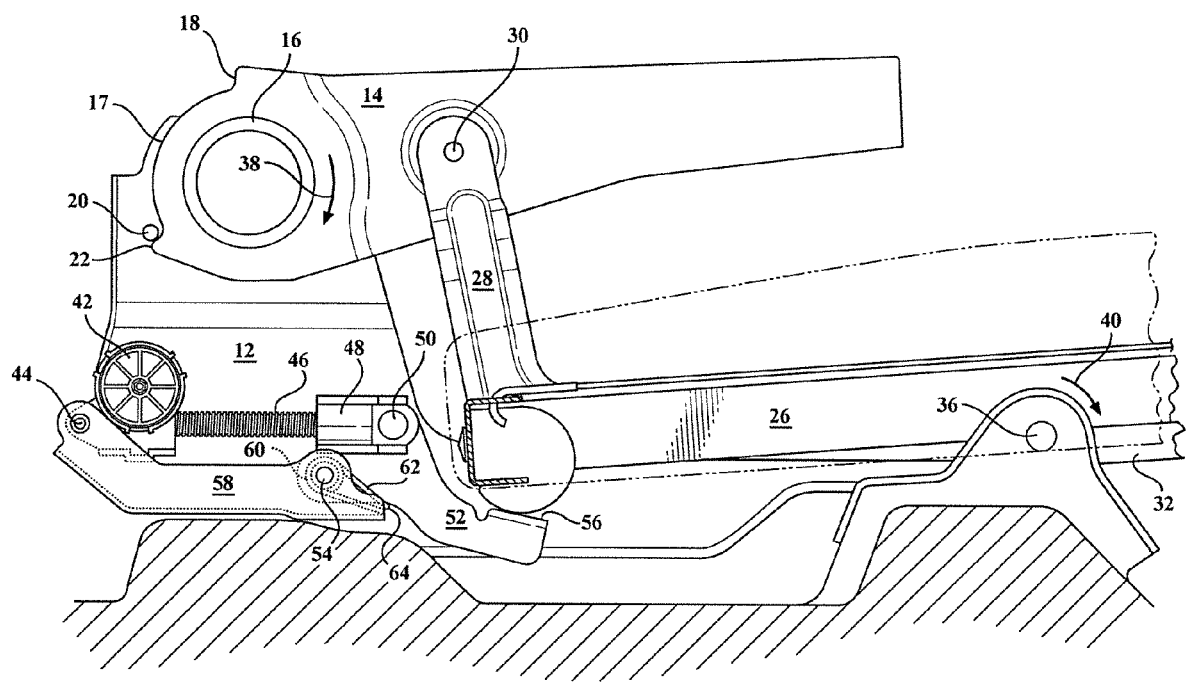
FIG. 2 is a succeeding illustration of the seatback in a manually triggered and forward dump position in combination with forward/downward collapsing of a linkage interconnected seat bottom.

As further shown in FIG. 1, depicted arm 14 is shown in a first upper design position and includes an arcuate bottom profile 17 terminating at a first edge configured ledge 18 which contacts a pin 20 extending from an outboard location of the stanchion 12. The arm engages along a side location of a frame forming a portion of the seatback in a first upper design position. A second edge configured ledge 22 is best shown in FIG. 2 in communication with an opposite end of the arcuate profile 17 and defines a rotationally offset stop location upon contacting the pin 20 (or alternately a second pin which can be optionally provided and which can be located proximate and below the first pin 20), such that the contacting relationship established between the first ledge 18 and first pin 20 in the upright design position (FIG. 1) converts to the contacting relationship established between the second ledge 18 and the pin 20 (FIG. 2) in the forwardly folded position.

A seat bottom likewise includes a pair of side members, illustrated by selected frame defining bottom member 26 defining part of a seat bottom frame supporting a seat bottom cushion. Rather than being fixedly secured to the frame, the bottom side members are pivotally interconnected in coaxial fashion to the arms 14 of the seatback frame, via a first pair of extending linkage arms, one of which is illustrated at 28, extending between pivotally inter-connecting locations above the seatback (see selected elevated pivotal connection at 30 relative to the stanchion pivot depicted again at 16 between the arms 14 and stanchion 12).

As further shown, the linkage arms 28 each extend both generally downwardly to lower pivotal connections established at inside facing locations of each of the bottom side members 26 proximate their rear end locations, such that they are hidden from view in each of FIGS. 1-5. The linkage arms 28 are understood to likewise pivotally inter-engage inside surfaces of each bottom frame member 26, as shown corresponding with rear extending ends of each member 26 (and as will be subsequently described as being located inboard of contact elements secured to outside surfaces of either or both of the bottom frames in order to facilitate upward resetting of the seat bottom and linkage interconnected seatback by the motor driven reset arm).

Figure 3:
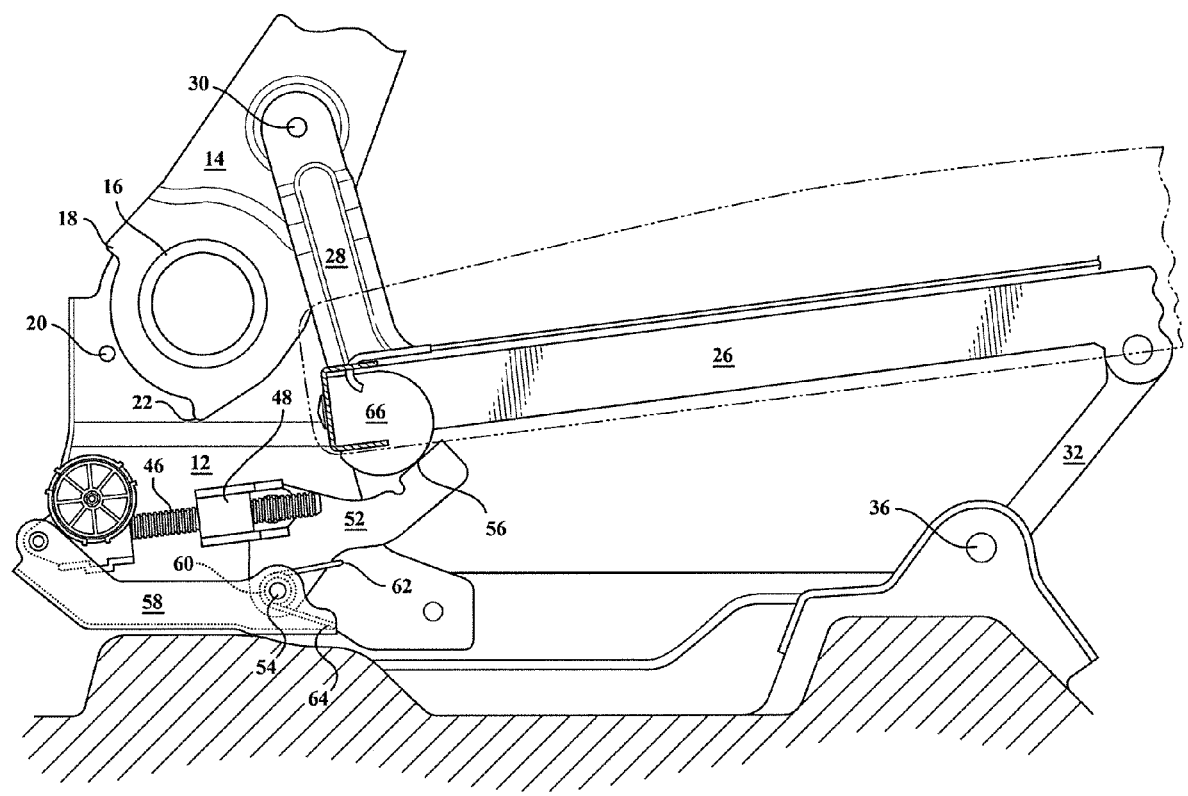
FIG. 3 is a further succeeding illustration of a motor rewind mechanism incorporating a pivotally driven reset arm engaging a contact element mounted to a side of the seat bottom in an intermediate return position for retracting the seat bottom and seatback toward the upright design position.
Figure 4:
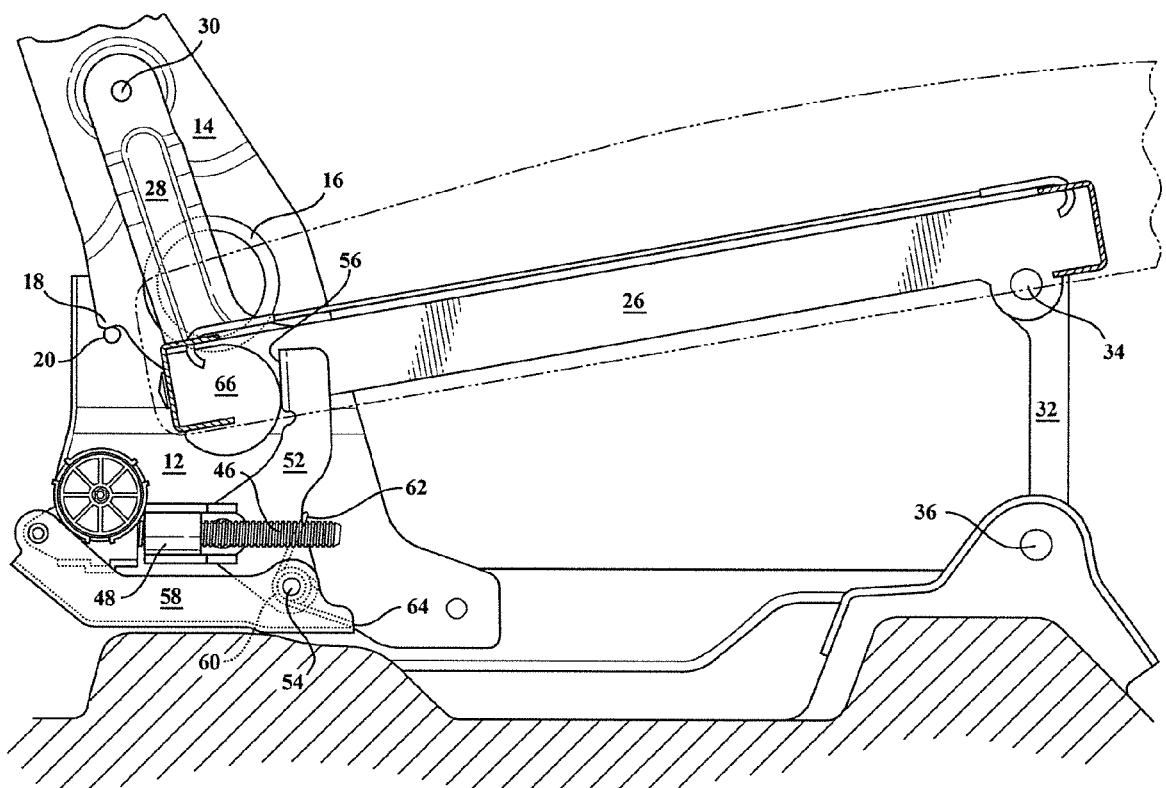
FIG. 4 is a successive and fully reset position of the seatback and bottom with the reset arm still in contact with the seat bottom.
Figure 5:
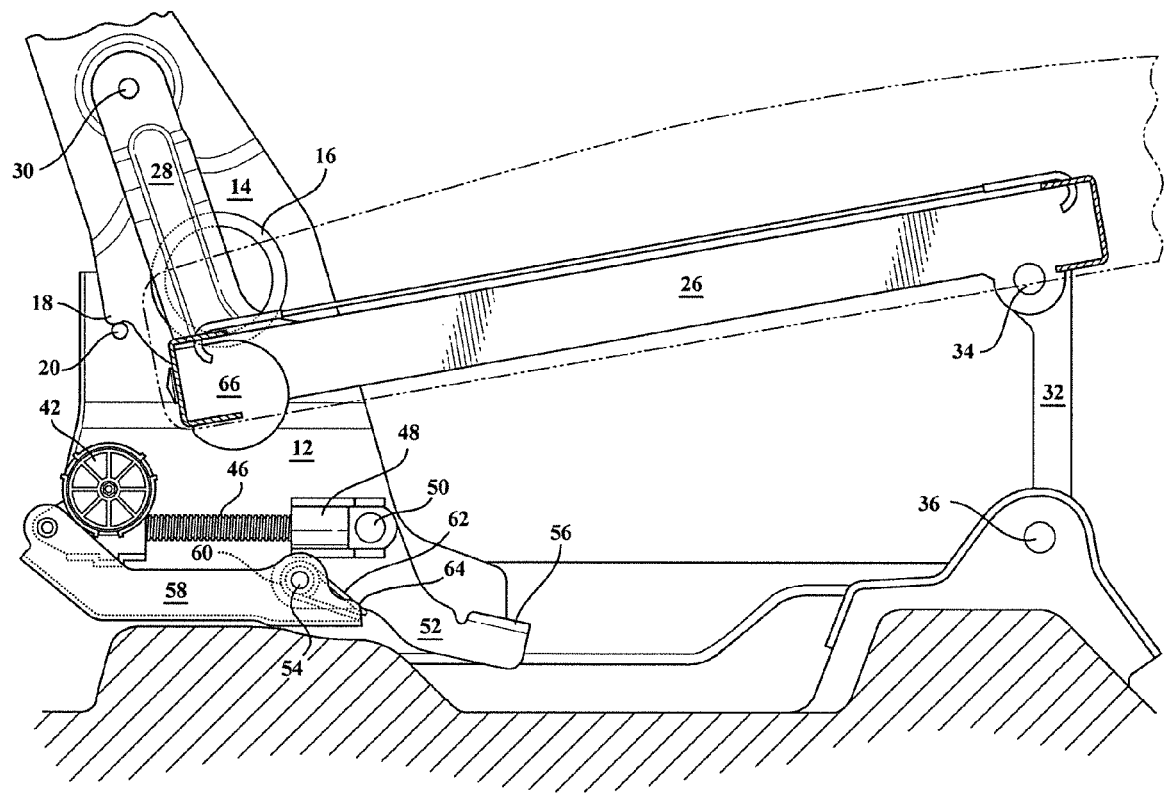
FIG. 5 is a further illustration of a reverse rotation of the motor rewind mechanism for resetting the reset arm to the original design position of FIG. 1.

A second pair of linkage arms, represented in the plan views of FIGS. 1-5 by arm 32 extend from forward ends of the bottom frame members 26, see upper pivotal connection 34 in each of FIGS. 1, 4 and 5, to a pair of floor supported coaxial pivot locations, see as further depicted at 36 associated with a raised location 37 upon the vehicle floor forward of the stanchions 12. A clock spring or the like (not shown in this variant but depicted in related variant including FIGS. 17-21 as will be further described) is associated with either or both of the seatback (arm 14) to stanchion pivotal locations (again at 16) and, upon being triggered by a separate latching structure as will also be described in further detail with reference to FIG. 10 et seq., results in rotation of the arm 14 from upright (FIG. 1) to forward dump (FIG. 2) positions and as generally reflected by arcuate directional arrow 38 in FIG. 2. By virtue of the linkage structure associated with the assembly, the seat bottom is simultaneously forwardly/downwardly collapsed toward the floor, via the first 28 and second 32 pairs of linkage arms, and as further reflected by arrow 40 in FIG. 2.

An electric motor assembly, generally depicted by housing 42, is illustrated and, in the particular variant, is pivotally mounted, at 44, to a lower end location of the stanchion support 12. As will be described with further reference to the succeeding variants of FIGS. 6-21, the motor assembly can also be supported (in a further non-limiting application) upon a floor location of the vehicle interior, such as between the spaced apart and floor supported stanchions.

The electric motor assembly includes an elongated and rotatably driven threaded shaft 46 which extends from the motor housing 42 and which is rotary driven upon activation of the electric motor components (not shown) which are contained within the housing 42. Also not shown are any necessary wiring and switches for selectively activating and deactivating the motor electric motor, such as for purposes of enabling upright rewinding of the seatback to the design position, and which will be described in further detail.

An interiorly threaded collar 48 is shown and which includes an interiorly threaded and circumferential surface extending therethrough such that the collar 48 is mounted over the threaded drive shaft 46 and, in response to rotation of the drive shaft in a selected direction by the motor, causes the collar 48 to linearly displace in either of outward or inward directions. A pin 50 is mounted to a projecting end of the collar 48 and extends inwardly from an inner facing side thereof to pivotally secure to a location of a reset arm 52, which is likewise pivotally supported at a further location 54 to the stanchion 12.

The reset aim 52 exhibits a generally elongated and irregular shape with a flattened profile and includes a remote and upwardly facing support surface 56 (extending crosswise relative to the elongated dimension appearing in plan view) at an opposite end-most location relative to its pivotal support location 54. A component support bracket is exhibited in partial phantom at 58 and which exhibits such as a modified "U" shape in cross section with an open upper edge for mounting in horizontally extending fashion along a lower edge of the stanchion 12 and in order to support both the pivotal mount 44 for the motor 42 as well as the pivotal mount 54 for the reset arm 52. As depicted subsequently in FIG. 16, variations of the support bracket 58 can include an elongated track which supports the motor mount and which extends between the stanchions in supported fashion upon the floor of the vehicle passenger interior.

Also depicted in phantom at 60 is a torsion spring mounted around the pin associated with the reset arm pivotal support 54, the torsion spring 60 including a first curled end 62 for engaging an underside of the reset arm 52, with an opposite second curled end 64 engaging a fixed stanchion location in order to upwardly bias the reset arm 52 in assistance with the motor retraction stage shown in FIGS. 2-4 and in order assist in upwardly resetting the combined weight of the linkage supported seat bottom 26 and the pivotally interconnected seat back 14. Additional features can include an obstruction sensor (not shown) incorporated into the motor for reversing a driving direction, such as in the event of an obstruction being detected during resetting to the upright design position.

Following triggered forward dump of the seatback arms 14 and concurrent forward collapsing of the linkage interconnected seat bottom 26 (see FIGS. 1-2), the motor drive shaft 46 is activated so as to be rotated in a first direction causing the collar 48 to descend inwardly along the shaft 46 (see in particular FIG. 3). This results in the reset arm 52 pivoting upwardly until the upper facing engagement surface 56 contacts a configured bottom surface of a generally three dimensional disk shaped contact element 66 which is secured to a rear edge of a selected seat bottom side, such as again depicted at 26 and which is arranged outside the first pair of linkage members 28 which again are pivotally supported against inside locations of the seat bottom sides.

In this fashion, the interconnecting linkage members are influenced to upwardly reset the seatback 14 to the design position (FIG. 4). The threaded motor shaft 46 is then driven in a reverse direction, causing the collar 48 to travel in a reverse/outward direction along the shaft 46 and the motor 42 and associated reset aim 52 to reset to their original position (each of FIGS. 1 and 5). Concurrently, the collapsible seat bottom can likewise supported by a suitable latching structure (not shown) and which can be retracted concurrent with the pivoting release of the seatback and re-engaged upon resetting of the same at the position of FIG. 4.

Additional features not shown can also include the provision of a puck recliner package incorporated on an opposite and inboard stanchion and which coordinates with a lever subassembly in pivotal contact with the upright arm 14 for triggering initial forward rotating dump of the seatback. A separate linkage subassembly may be located upon an outboard side of the stanchion for providing upright rewinding and resetting of the seatback.

Figure 6:
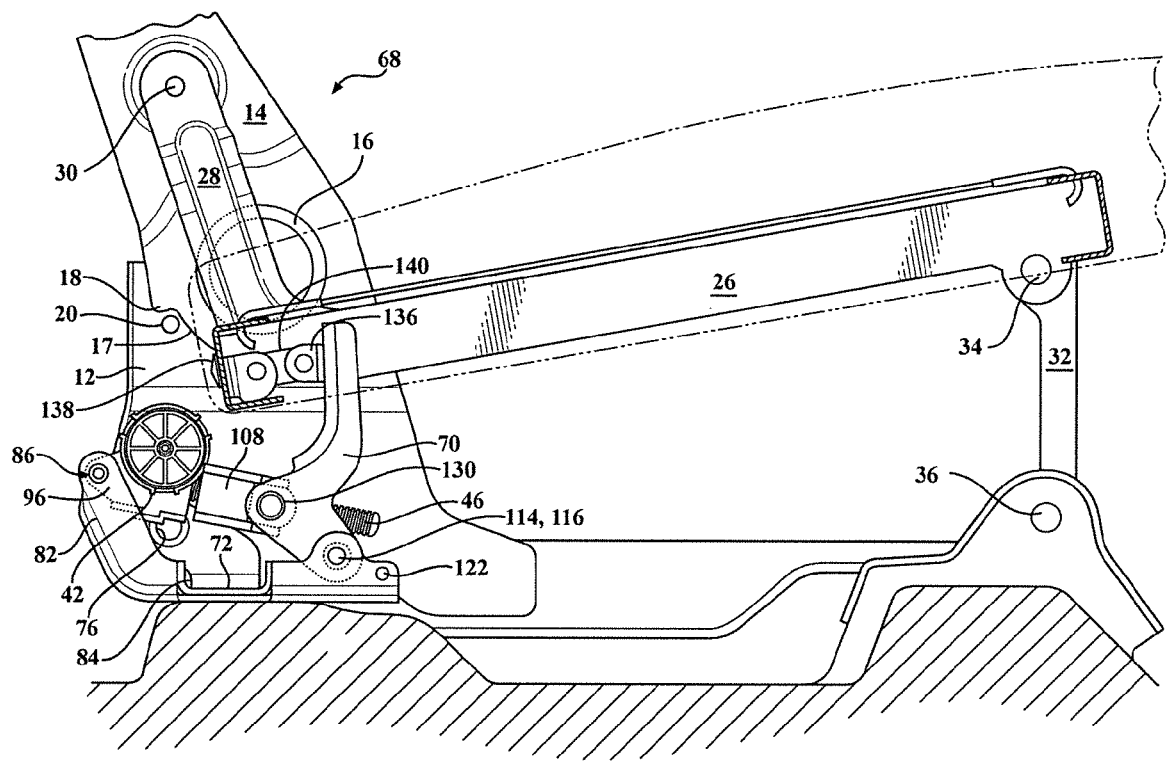
FIG. 6 is a plan view of a seat assembly according to a further power-up/power-down variant incorporating the latch mechanism in an upright design position.

Proceeding to FIG. 6, a plan view is generally shown at 68 of a seat assembly according to a further power-up/power-down variant incorporating the latch mechanism in an upright design position. As will be described in further detail, and in the power-up/power-down variant, the motor and associated linkage controls both up/down motion of the seatback, via a variation of the elongated drive arm 70 (compare to at 52 in FIGS. 1-6) pivotally connected to each of a floor supported location, an intermediate location associated with the linearly displaceable motor drive collar, and an uppermost linkage location associated with the seat bottom which in turn controls pivoting of the seatback as previously described in FIGS. 1-5 and as again shown by arm 28 and upper pivot location 30 which is offset from main pivot 16.

Figure 16:
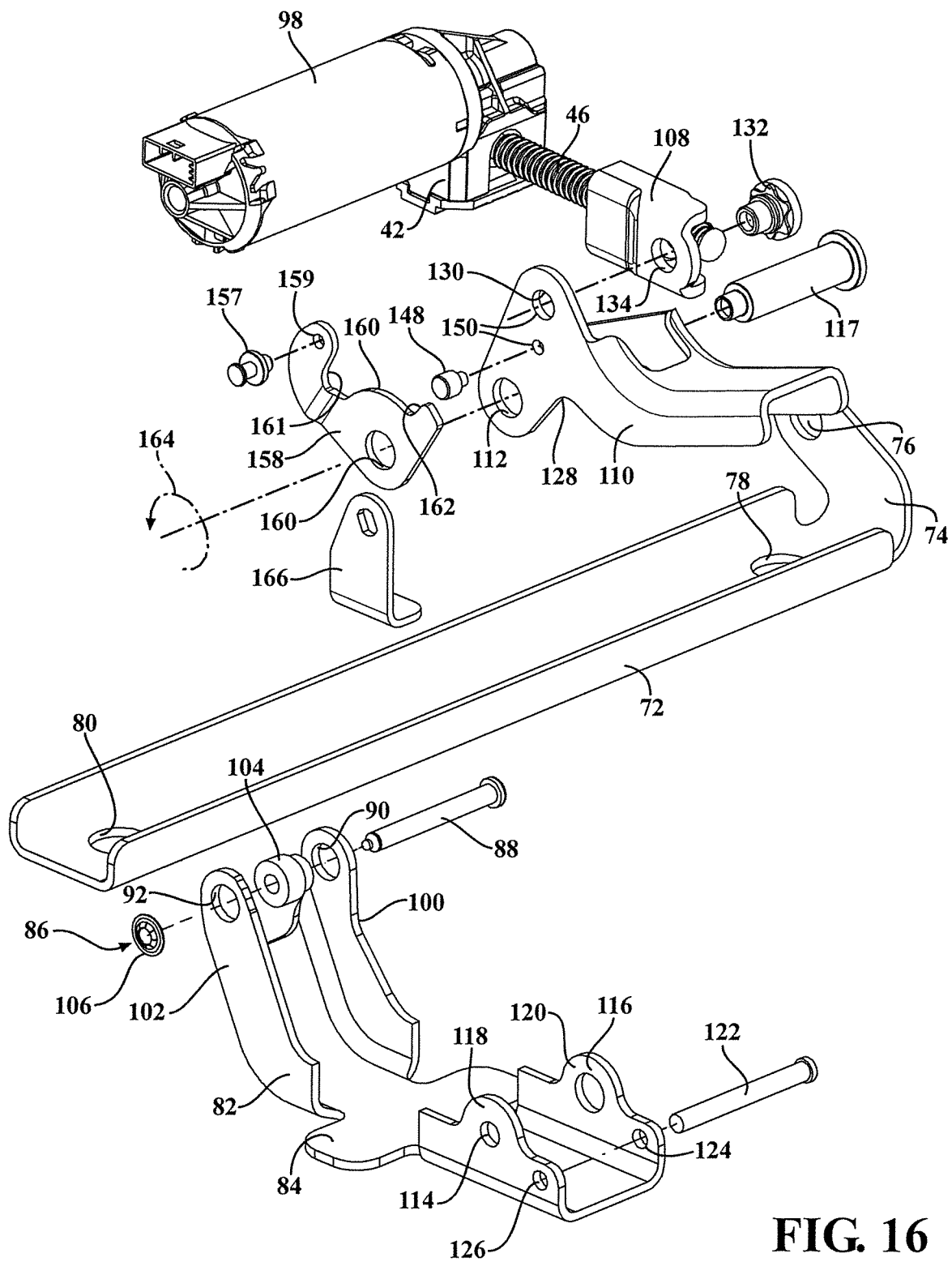
FIG. 16 is an exploded view of the motor, linkage and floor support plate for securing to the floor of the vehicle between the existing seat support stanchions and further illustrating a variant of a pivotally supported pawl to that previously depicted in FIG. 10 et seq.

With reference to the alternate variant otherwise shown in FIG. 16, a primary or first floor support plate 72 is illustrated which is used throughout the several embodiments of the invention and which can be mounted to the floor of the vehicle in extending fashion between the pair of spaced apart and seat supporting stanchions (again represented in plan view by selected stanchion 12). The floor support plate 72 exhibits a generally "U" shaped recess defined profile in end section and includes an end configure and upwardly angled bracket or tab 74 including an elevated closed inner perimeter extending and circumferential surface 76 for mounting to a side location of the stanchion 12. As further shown in FIG. 16, additional apertures 78 and 80 can be formed in bottom locations of the support plate 72, such facilitating anchoring of the plate in extending fashion between a pair of spaced apart and seat supporting stanchions.

Figure 17:
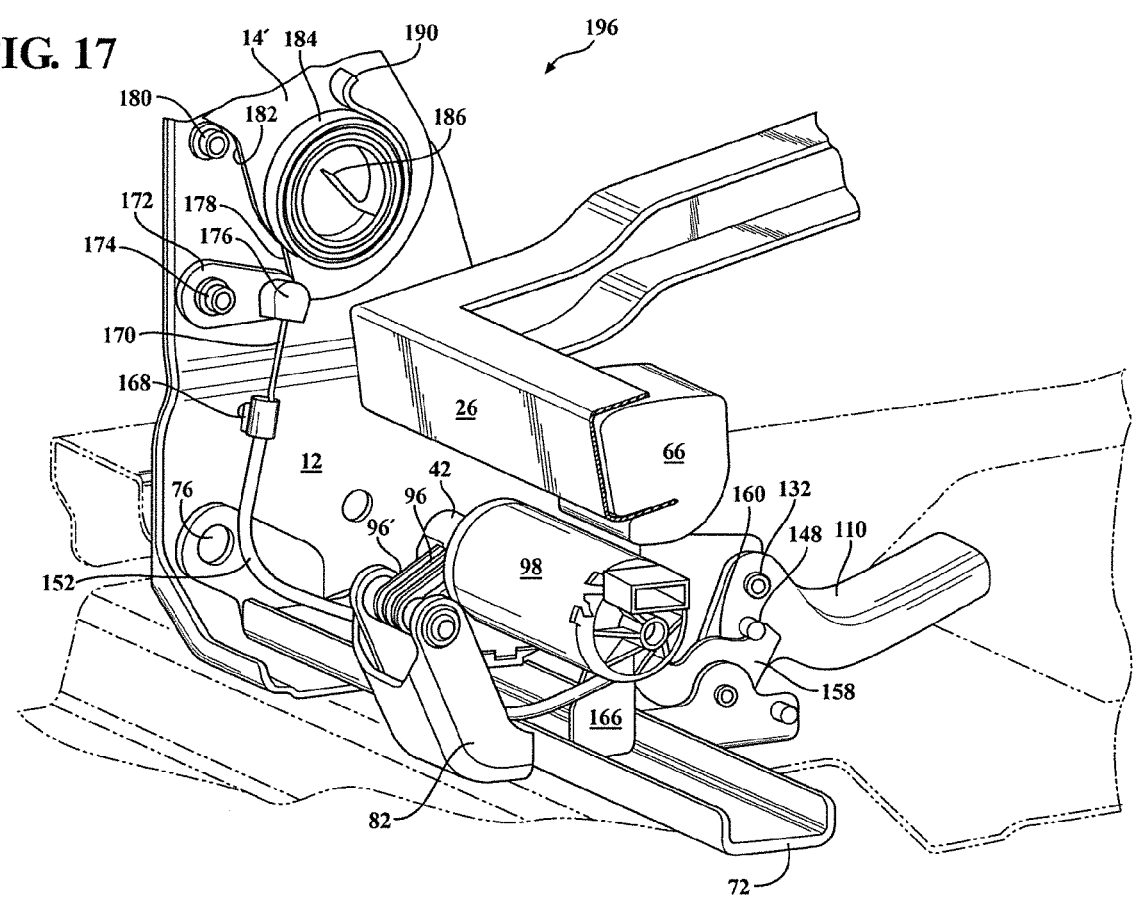
FIG. 17 is an assembled view of FIG. 16 in combination with a selected seat support stanchion and release cable extending between the pawl and seatback release lever.

A secondary floor support plate 82 is also depicted in the various embodiments oand includes a generally three sided and elongated/angularly configured body including a flattened central location (see crosswise accessible surface 84) which seats the crosswise extending primary support plate 72 (see as best shown in assembled perspective of FIG. 17 and in which the secondary floor support plate 82 is arranged at a generally mid-point location of the primary support plate 72 extending between the spaced apart seat supporting stanchions). Again comparing FIGS. 6-9 with the additional perspectives of FIGS. 16-17, motor housing 42 is pivotally supported at a rear end location, see as generally shown at 86 in FIGS. 6 and 16 in comparison to as depicted at 44 in FIG. 1).

In one pivotal mounting arrangement, a pin 88 (FIG. 16) extends through a pair of spaced apart and aligned apertures 92 and 94 defined in upper angled ends of the secondary support plate 82 and extending through end supporting locations (see at 96 in FIG. 6 as well as at 96 and 96' in FIG. 17) associated with the base of the motor housing 42 which also supports the drive components exhibited by cylindrical shaped body 98 in FIG. 16. In order to properly support the motor housing mount in pivoting fashion, the end supporting location referenced at 96 is typically a pair of spaced apart ears (again at 96 and 96' in FIG. 17) which overlap either of interior or exterior facing sides of each of the angled sides (see at 100 and 102 in FIG. 16), these also including additional apertures (not shown) which align with those indicated at 90 and 92. An intermediate support bushing 104 is also shown in FIG. 16 and, along with an end supported washer 106, pivotally supports the base end of the motor housing 42.

As previously also described in the initially disclosed variant 10 of FIGS. 1-5, exteriorly threaded screw 46 extends from the motor housing 42 and, in response to activation of power to the motor, rotates in either of first or second directions in order to linearly displace a reconfigured collar 108 there along, the collar again including an interiorly threaded aperture for rotationally receiving the exterior of the screw 46. Each of the alternately configured pivoting support arms (not limited to each of those previously shown at 52 in FIG. 1, at 70 in FIG. 6, as well as at 110 in FIG. 16) includes a lower most aperture or pair of apertures (see as shown at 112 in FIG. 16) which seat in aligning fashion between additional and aligning apertures 114 and 116 associated with a forward most supporting location of the secondary crosswise supported floor plate 82.

As further best shown in FIG. 16, the apertures 114 and 116 are configured within a pair of vertically extending ears 118 and 120 associated with the secondary floor plate 82 and, upon aligning the support arm apertures 112 and inserting a support pin 117, afford the support arm (52, 70 or 110) a desired degree of pivot. Also shown is a stop pin 122 which extends through additional forward most apertures 124 and 126 located in the secondary floor plate 84, these functioning to support the pin 122 at a location which defines a forward most rotating abutment to a contacting and intermediately configured underside location 128 of the support arm (see also as shown in forward most pivoted location of the support arm in FIG. 8).

An intermediate pivotal mounting arrangement is again established between the variants of the support arm at 70 and 110 and includes an aperture 130 (FIG. 16) at an elevated or peaked location, this receiving a rivet or collar 132 also passing through an aperture 134 in the linearly displaceable collar 108 in order to mount the collar 108 to the support aim in an inter-pivoting fashion. In this manner, actuation of the motor in either of two driving linear driving directions established by the thread-ably supported collar 108 causes concurrent pivoting the support arm about the floor plate apertures 114/116.

Returning to the power-up/power-down variant originally depicted in FIG. 6, the selected variant utilizing the support arm 70 includes, at an outer-most end, a tab 136. An end location of the seat bottom 26 includes a further tab 138, each of the tabs 136/138 including an aperture between which is pivotally supported an intermediate extending link 140 such that the support arm is continuously connected to the seat bottom 26 and inter-pivotally salved seatback 14. As further shown, a single pin 20 is depicted extending from a side location of the stanchion 12 and engages the first arcuate communicating ledge 18 in the upright design position.

Figure 7:
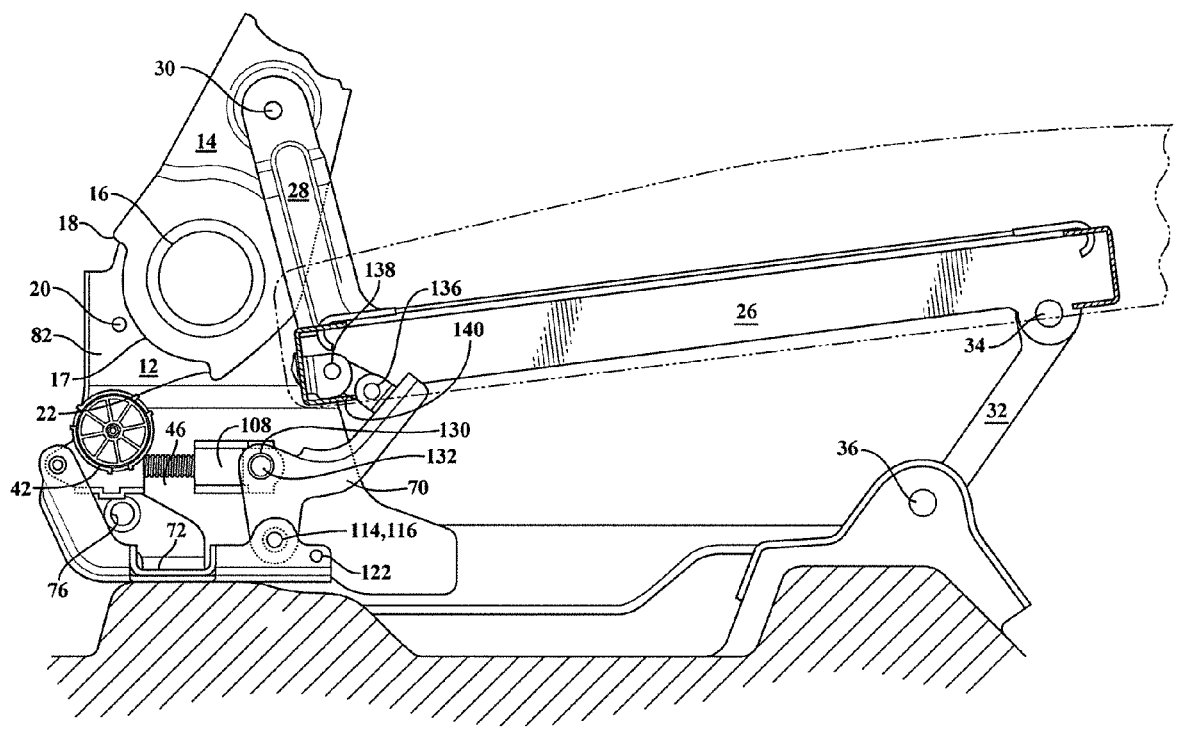
FIG. 7 is a successive view to FIG. 6 and illustrating the seat bottom and linkage connected seatback in an intermediate forward displaced and rotated/dump position.
Figure 8:
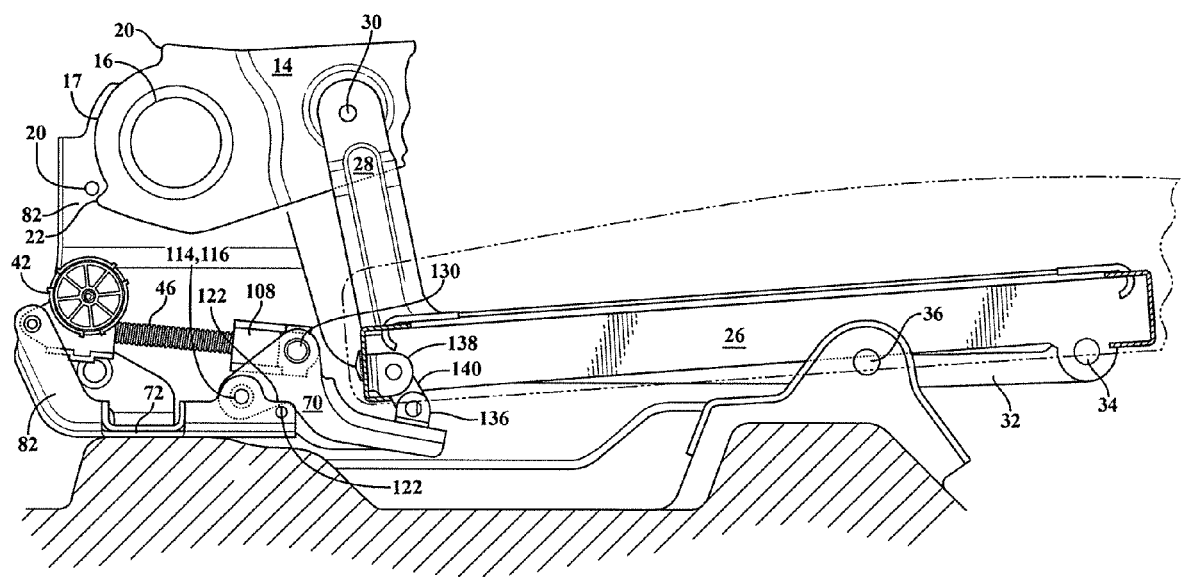
FIG. 8 is a succeeding view to FIG. 7 illustrating the seat bottom in a forward/downward most displaced position and the linkage connected seatback in a forward rotated dump position relative to the main pivot connections with the spaced apart seat stanchions.

FIG. 7 is a successive view to FIG. 6 and illustrates the seat bottom 26 and linkage 28 connected seatback 14 in an intermediate forward displaced and rotated/dump position, with FIG. 8 successively illustrating the seat bottom in a forward/downward most displaced position and the linkage connected seatback in a forward rotated dump position relative to the main pivot connections (again at 16) with the spaced apart seat stanchions. At the position of FIG. 8, the collar 108 is displaced to a forward-most location along the rotationally driven screw 46 concurrent with the second arcuate end communicating ledge 22 abutting the stanchion supported pin 20 (as opposed to a second pin 24 as in the embodiment of FIGS. 1-5) and in order to define the forward-most rotated position of the seatback 14.

Figure 9:
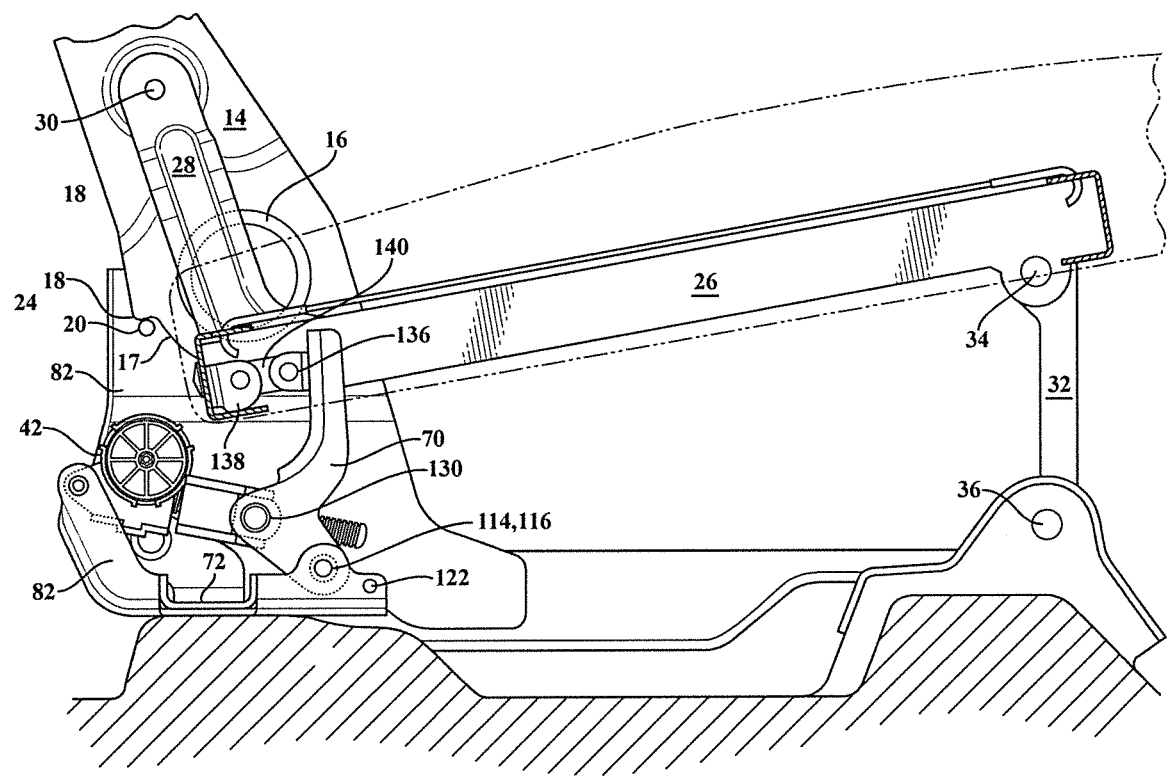
FIG. 9 is a reverse upright rotated position substantially as shown in FIG. 6 and in which the motor and associated linkage controls both up/down motion of the seatback, via a drive arm pivotally connected between the bi-directionally displaceable collar and a further pivotal location associated with a rear end of the seat bottom which in turn pivotally controls pivoting of the seatback via an upwardly extending support arm which pivots relative to an elevated side location of the seat frame above its main pivot connection to the seat stanchions.

FIG. 9 is a reverse upright rotated position substantially as shown in FIG. 6, and in which the motor and associated linkage controls return upright motion of the seatback 14 (see reverse inward displacement of the collar 108 along the rotatable screw drive 46 and in a direction toward the motor housing 42, via the drive arm 70 pivotally connected between the bi-directionally displaceable collar 108 and the further pivotal location (see again aperture in tab 138) associated with a rear end of the seat bottom 26, this in turn pivotally controlling pivoting of the seatback 14 via the upwardly extending (and inter-linkage defining) support arm 28 which pivots relative to an elevated side location of the seat frame above its main pivot connection 16 to the seat stanchions 12. As with the first described variant 10, a pair of forward located and pivoting supports 32 extend between upper 34 and lower 36 locations associated with the forward underside locations of the seat bottom and the floor, respectively, in order to coordinate the forward/downward pivoting of the seat bottom 26 and the pivotally slaved seatback 14 in the manner depicted.

Figure 10:
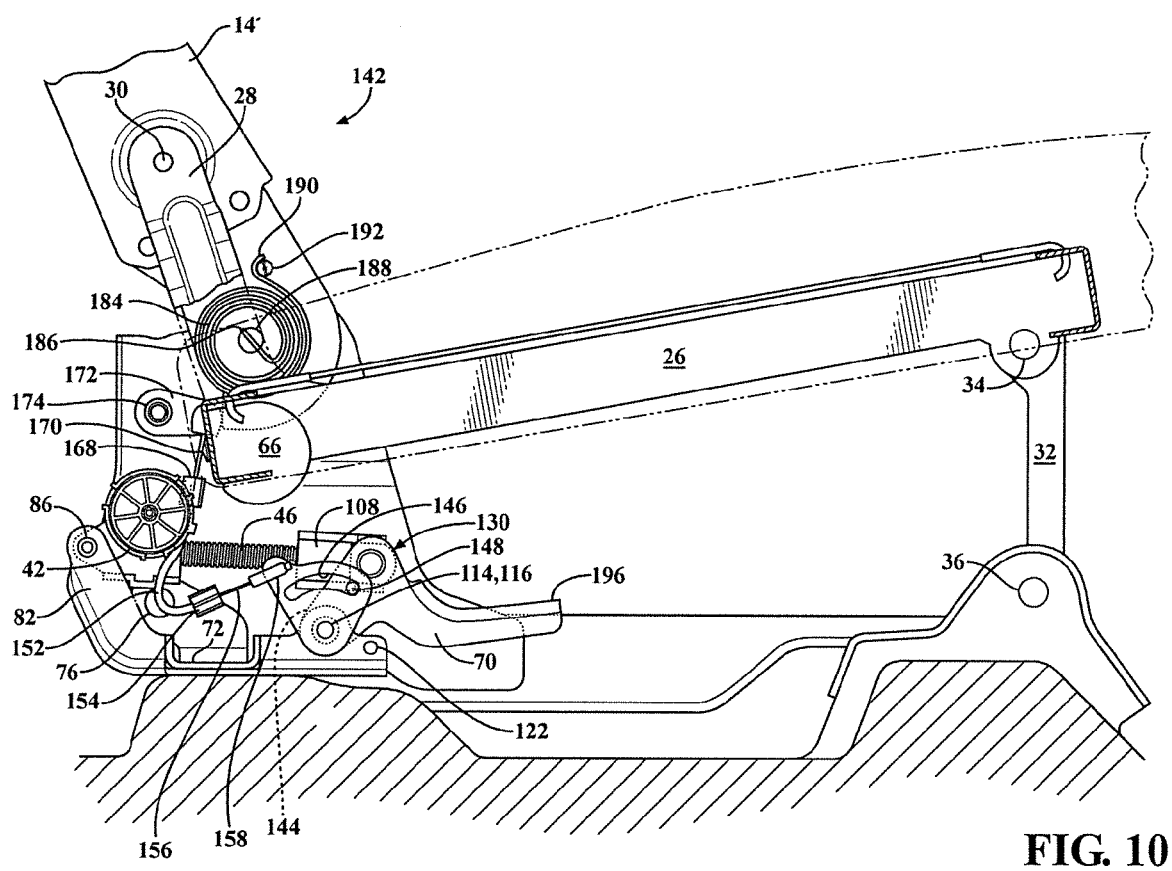
FIG. 10 is a plan view of a seat assembly in an upright design position according to a variant of the forward dump and power rewind variant of FIGS. 1-5.

FIG. 10 is a plan view of a seat assembly, generally at 142, in an upright design position and according to a related variant of the forward dump and power rewind variant of FIGS. 1-5 (and as opposed to the interlinked power-up/power-down variant depicted in FIGS. 6-9). The support arm 70 and motor driven linkages depicted in FIGS. 6-9 are repeated, with the exception that they operate in similar fashion to the previous version of the pivotal support arm 52 in FIGS. 1-5 and do not include the additional linking tabs 136/138 and intermediate link 140. Also repeated from the related variants of FIGS. 6-9 and 15-21 are the provision of the primary floor support plate 72 and secondary support plate 84, a repetitive description of which is unnecessary.

Additional features depicted in each of the variants of FIGS. 10-15 and 16-21, as will be described in further detail, include variations of a pivot plate or like pawl release component or sector. This is illustrated in each of FIGS. 10-14 by a generally triangular shaped flattened body 144 which is includes a lower positioned aperture for mounting in aligning fashion with the spaced apart apertures 114/116 in the second floor plate 84 and the aligning aperture 112 in the pivotal support and rewind arm 70 or 110, such being held in place by pin 117 as again shown in FIG. 16.

The triangular shaped body 144 further exhibits an arcuate slot or channel (see inner perimeter surface 146) which overlaps and seats a pin 148 mounted to an upper location of the support arm (see aperture 150 in variant 110 of FIG. 16). A cable (see outer sheath 152) is also provided for each of the variants of FIGS. 10-15 and FIGS. 16-21 provided. The cable is anchored via a first fitting 154 to such as an exterior location of the associated stanchion or other bracket support and so that an inner displaceable component 156 extends from the sheath 152 and engages an edge location of the rotatable pawl 144 which is offset from its main pivot location 114/116.

In contrast, and looking at the variant of FIGS. 15-21, the rotatable pawl is redesigned as indicated at 158 and likewise includes a mounting apertures 160 which overlaps the support arm aperture 112 and the second floor support plate apertures 114, 116. As opposed to the inner arcuate slot of FIG. 10, the redesigned pawl 158 includes an arcuate upper surface 160 with a first projecting ledge surface 162 and which, upon mounting the rotatable pawl 158 to the support arm, contacts the pin 148 in a counter-clockwise rotating direction (see arrow 164 in FIG. 16) in order to pivot the support arm 110 to rewind the seat bottom and seatback to the upright design position as will be further described below.

Also shown in FIG. 16 is an additional floor support bracket 166 which, as best shown in FIG. 17, supports an exterior surface of the rotatable pawl 158 as well as optionally an underside surface of the motor drive and internal gearing reflected by cylindrical housing portion 98. Comparing FIG. 16 to FIGS. 10-15, the pawl 158 includes a further pin 157 mounted to an opposite end location of the pawl depicted by an aperture 159, the first inner displaceable end of the cable 156 shown in FIG. 10 being anchored to the pin 157 in a similar displaceable fashion. The rotatable pawl 158 of FIG. 16 (contrasting again to the more triangular shaped version 144 of FIG. 10) also exhibits a second configured ledge defining location 161 which is arranged in communication with the arcuate surface 160 a rotationally offset distance from the first ledge 162, these ledge surfaces 161/162 operating in similar fashion as the opposite ends of the inner defined slot 146 for the rotatable pawl 144.

As further best shown in FIG. 17, the cable 152 depicted in the embodiments of each of FIGS. 10 and 16 each further includes a second anchored fitting 168 mounted to a further elevated location of the selected stanchion 12 and from which projects an inner displacing second end portion 170 of the cable. A lever 172 is mounted to a further pivoting location (see rivet 174) of the stanchion 12, to a free end of which is engaged an end cap 176 of the displaceable second end 170 of the cable.

As also shown in FIG. 17, an outer curved edge location of the lever 172 abuts an opposing ledge surface 178 of a redesigned seatback sector 14' (this applicable to each of the variants of FIGS. 10 and 16). Additional features shown include a rivet 180 mounted to a further elevated location of the stanchion 12 and which engages a further exteriorly configured surface location 182 of the seatback 14' in order to define the upright design position of the seatback shown in each of FIGS. 10 and 18.

A main clock spring 184 (see as shown in each of FIGS. 10 and 17) is provided and is coaxially mounted to the main pivot (at 16 in FIG. 6) established by the seatback sector 14'. This includes an inner end 186 of the clock spring 184 seating a pin 188 (FIG. 10) anchored to a rotational midpoint of the main seatback pivot location, an outer curled end 190 engaging a rotationally offset rivet 192 mounted to an outer location of the seatback 14'.

Given the above structural description of the related variants of FIGS. 10-15 and 16-21, FIG. 11 is a succeeding illustration to FIG. 10 and again illustrates the displaceable cable 156 extending from a first end in contact with the release lever 172 engaging the spring biased seatback 14' in the design position, the second end 170 of the cable extending in engagement with the selected configuration of pivot plate or pawl component depicted at 144. In order to trigger release of the seatback 14' and linkage associated seat bottom 26 (see again interlinking arm 28), the motor 42 is selectively activated in a first driving direction in which the collar 108 is caused to displace outwardly along the rotatable screw 46, thereby causing the pawl 144 to pivot in a generally clockwise direction (see arrow 194) such that the pin 148 extending from the support arm 70 is caused to engage the selected end of the arcuate channel 146 and to thereby cause the inner displaceable cable at end 156 to be exteriorly displaced relative to the fixed outer sheath 152.

Figure 11:
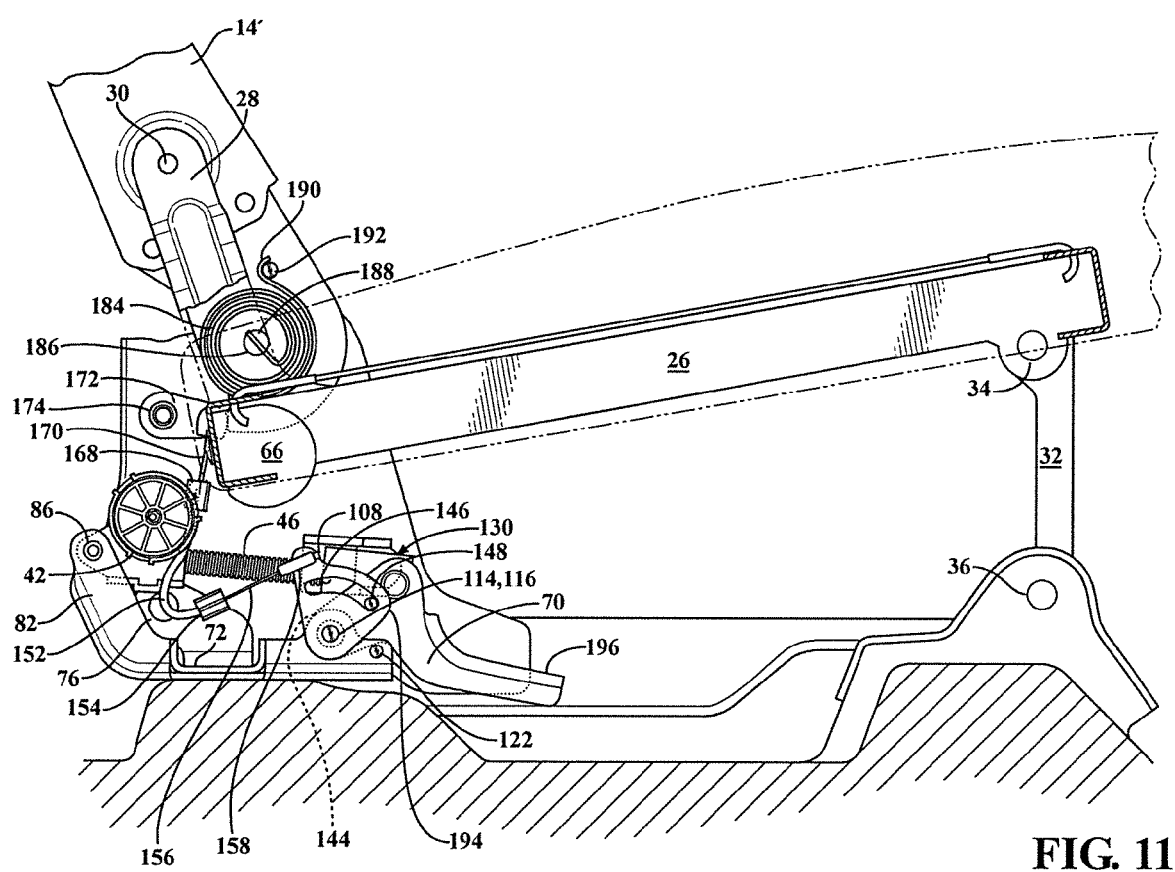
FIG. 11 is a succeeding illustration to FIG. 10 and illustrating the displaceable cable extending from a first end in contact with a release lever engaging the spring biased seatback in the design position, a second end of the cable extending in engagement with a pivot plate or pawl component associated with a displaceable collar mounted to the rotary drive screw of the motor and which is extended in a first forward displacing condition of the collar in order to trigger the manual and spring biased seatback rotation.
Figure 12:
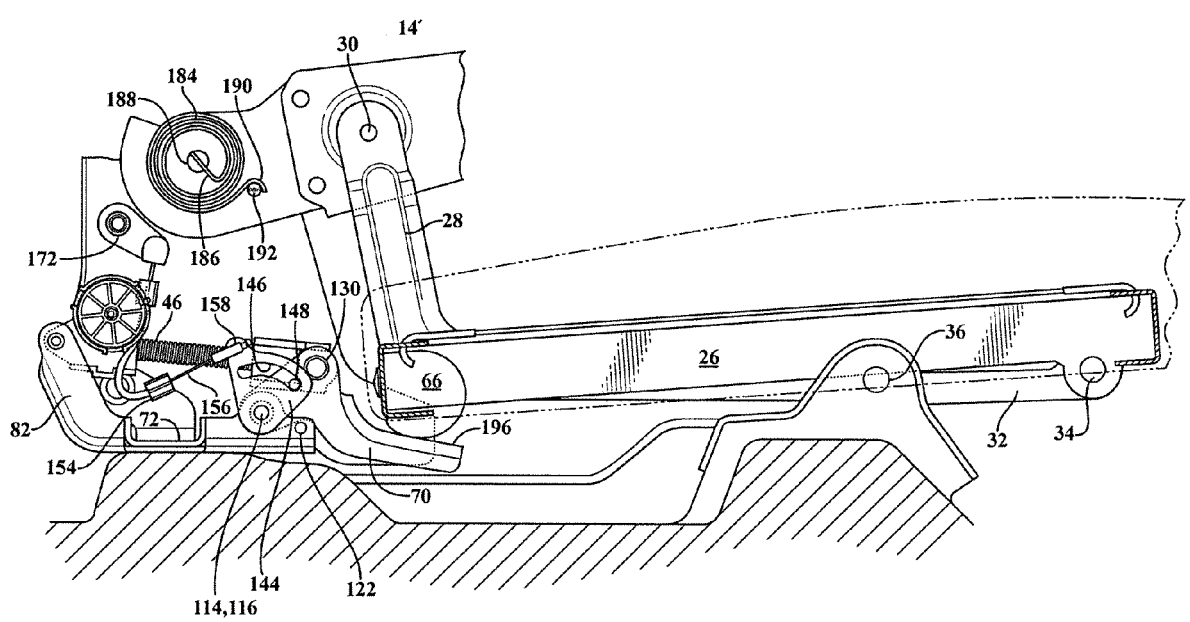
FIG. 12 is a succeeding view to FIG. 11 illustrating the seat bottom in a forward/downward most displaced position and the linkage connected seatback in a forward rotated dump position relative to the main pivot connections with the spaced apart seat stanchions.

At this point, the lever 172 is rotated in a like clockwise direction out of engagement with the seatback 14' (see again ledge surface 178 in FIG. 17), at which point the seatback 14' is caused to rotate to the dump position of FIG. 12. It is worth noting that the incidental outer displacing and driving motion of the motor and screw in the initial triggering protocol of FIGS. 10-12 is unrelated to the functioning of the support arm 70 in the succeeding upward resetting protocol of the seat bottom 26 and associated seatback 14' further shown in FIGS. 13-14, the support arm 70 in FIGS. 10-12 only being utilized to the degree that is functions as an intermediary linkage between the outer displacement of the screw supported collar 108 and the clockwise (194) pivoting of the pawl 144.

Figure 13:
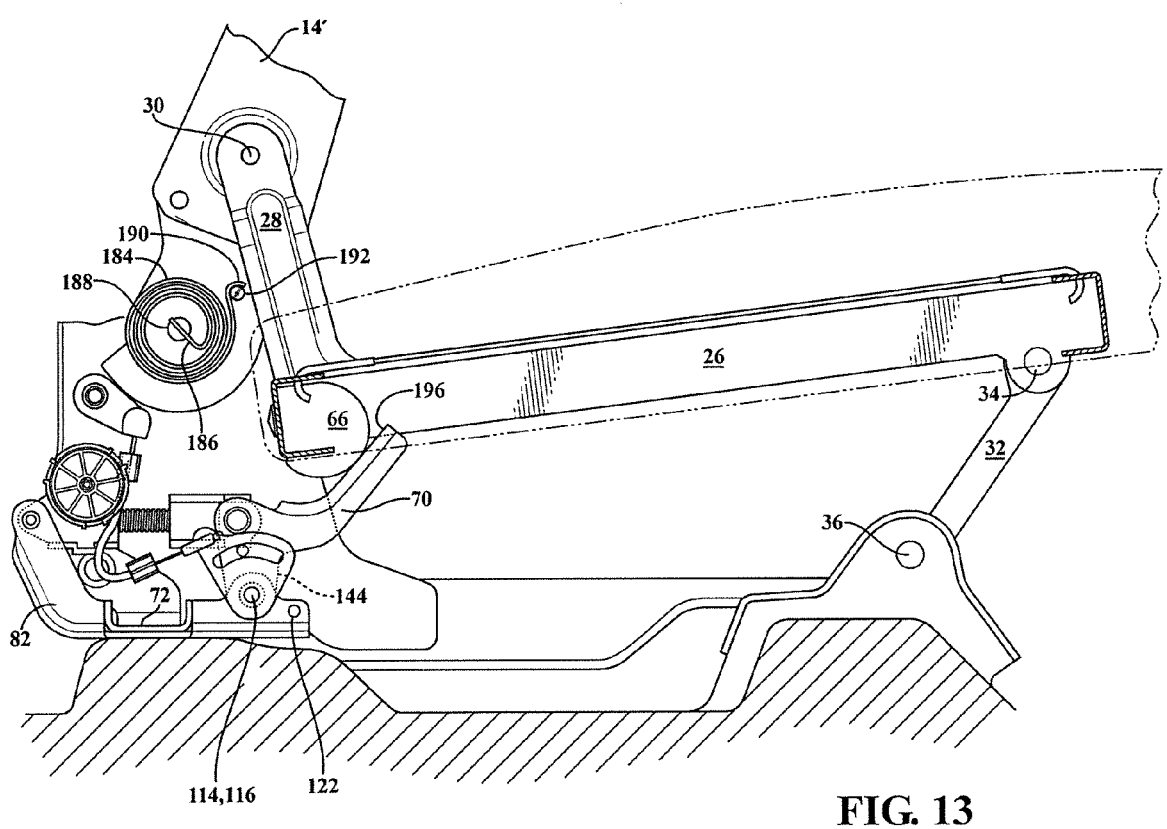
FIG. 13 is an intermediate upright return position of the assembly in FIGS. 10-12 and in which the pivotal and motor linkage controlled support arm engages an underside location of the seat bottom similar to as previously shown in FIG. 1 during upright rewinding of the seat bottom and pivotally supported seatback.

FIG. 12 is a succeeding view to FIG. 11 and illustrates the seat bottom 26 in a forward/downward most displaced position and the linkage connected seatback 14' in a forward rotated dump position relative to the main pivot connections (again at 16 as previously described with reference also to midpoint mounting location 188 associated with the inner biasing end 188 of the clock spring 184) associated with the spaced apart seat stanchions. FIG. 13 is an intermediate upright return position of the assembly in FIGS. 10-12, and in which the pivotal and motor linkage controlled support arm engages an underside location of the seat bottom similar to as previously shown in FIG. 1 during upright rewinding of the seat bottom and pivotally supported seatback. At this point, an upper surface location of the pivotal support arm 70 (shown at 196 and corresponding to that shown at 56 in reference to the initial variant 52 of support arm) engages an underside of the disk shaped contact element 66 again similar configured and located at the rear ends of the seat bottom 26 in the manner previously described.

Figure 14:
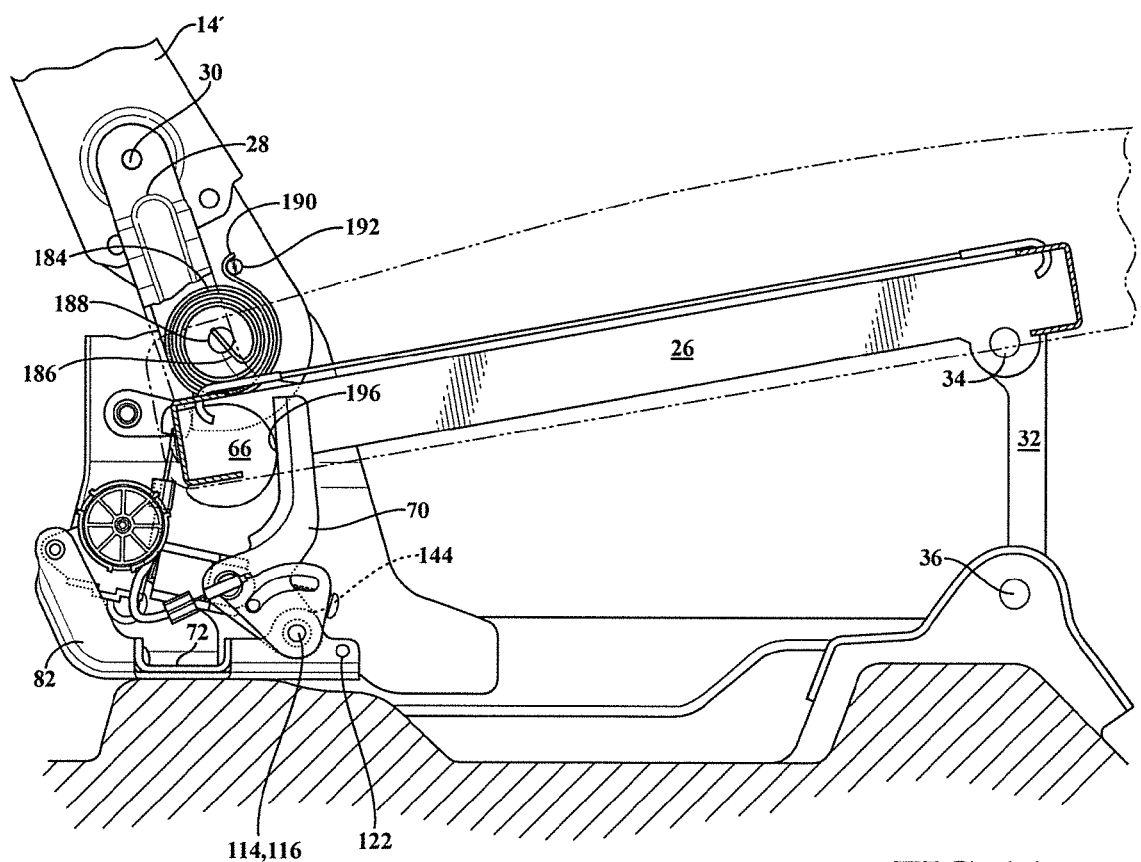
FIG. 14 is a succeeding and fully upright return position of the assembly shown in FIG. 13.
Figure 15:
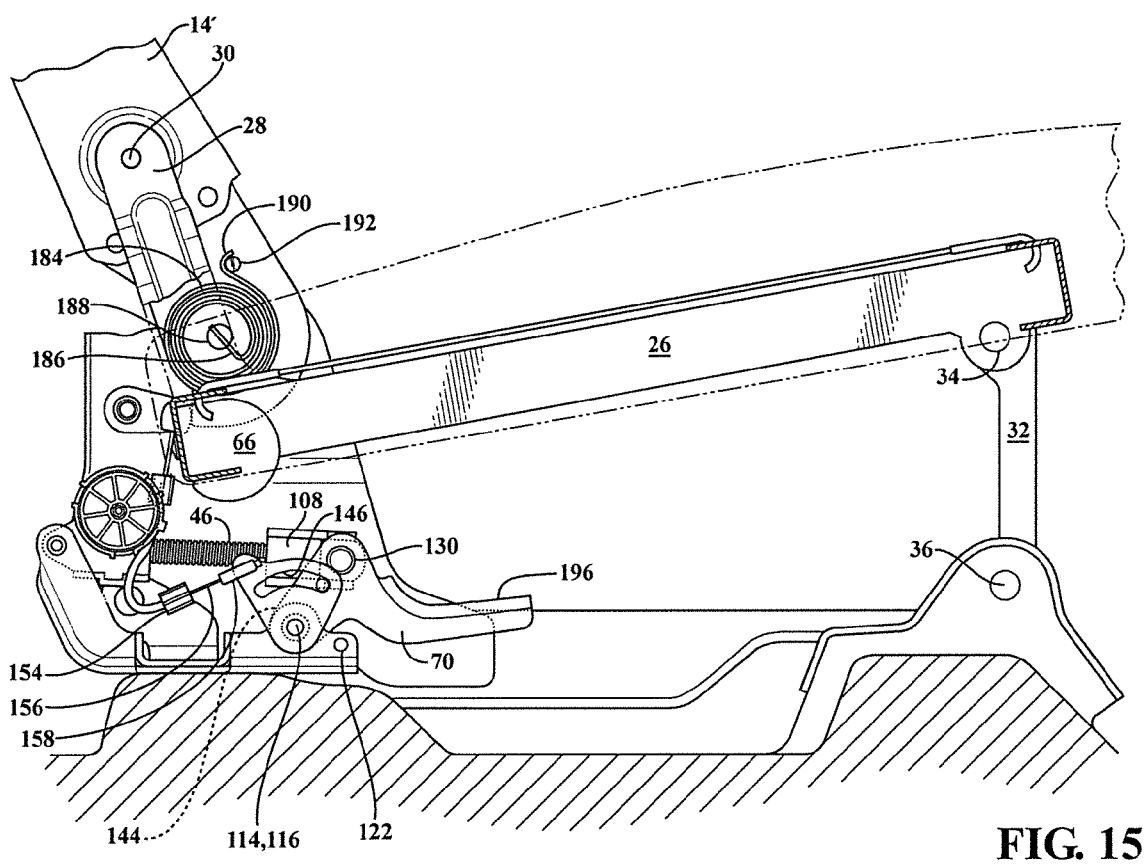
FIG. 15 illustrates a further succeeding reset position of the motor and linkage supported arm as initially shown in FIG. 10.

FIG. 14 is a succeeding and fully upright return position of the assembly shown in FIG. 13, this resulting from completed upward rewinding of the seat bottom 26 and pivotally/linkage associated seatback 14' in the manner previously described in FIGS. 1-5 and, upon the lever 172 resetting into contact with the ledge supporting location 178 of the seatback sector 14' as depicted in FIG. 17, the motor and linkage supporting components as shown in FIG. 15 are allowed to reset in the manner shown in FIG. 15 which is identical to that of FIG. 10. FIG. 15 illustrates a further succeeding reset position of the motor and linkage supported arm as initially shown in FIG. 10.

As previously described, FIG. 16 is an exploded view of the motor, linkage and floor support plate for securing to the floor of the vehicle between the existing seat support stanchions and further illustrating another variant (see as generally depicted at 196 in succeeding FIG. 17) of a pivotally supported pawl, again at 158, and as compared to that previously depicted in FIG. 10 et seq. FIG. 17 again shows an assembled view of FIG. 16 in combination with a selected seat support stanchion 12 and release cable assembly extending between the particular configuration of the pawl 158 and the seatback release lever 172. As previously described, the variant 196 of FIGS. 16-21 operates substantially as in FIGS. 10-15, the only difference being the redesigning of the pawl element from 144 to 158.

Figure 18:
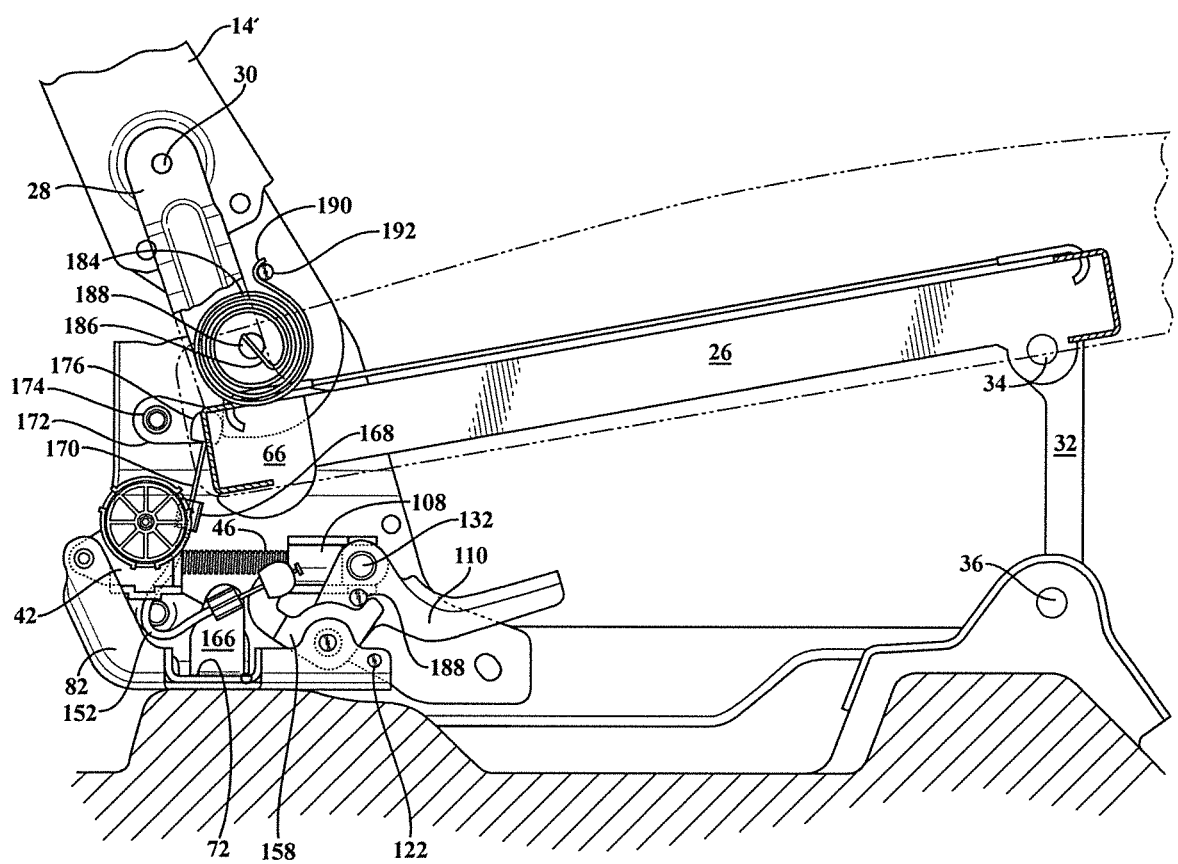
FIG. 18 is a plan view of an upright design position of a variant of seat assembly utilizing the structure of FIGS. 16-17.
Figure 19:
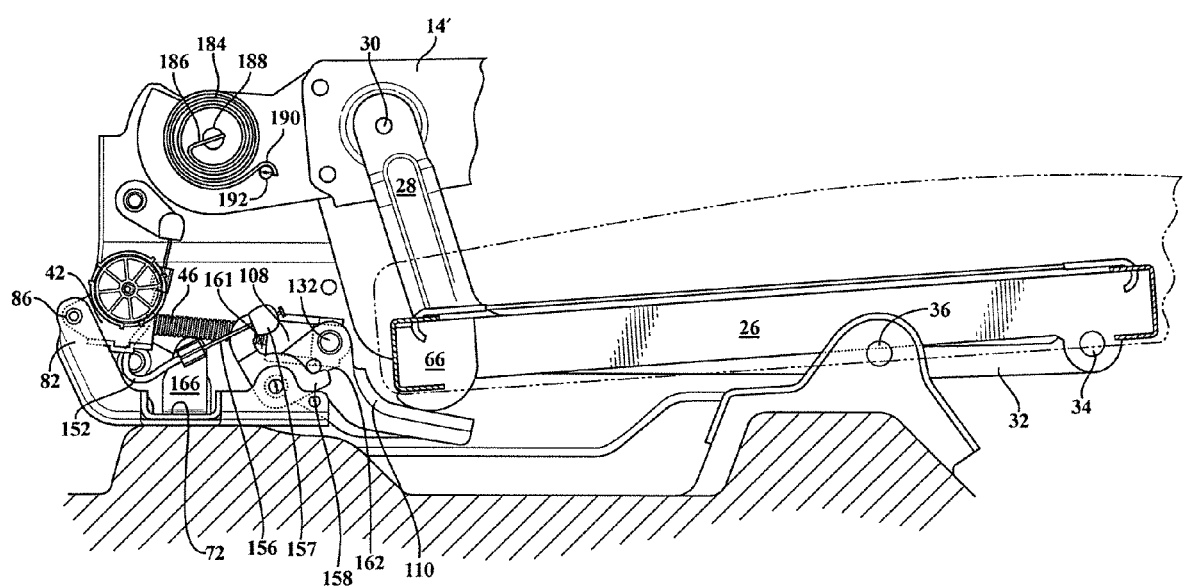
FIG. 19 is a succeeding view to FIG. 18 illustrating the seat bottom in a forward/downward most displaced position and the linkage connected seatback in a forward rotated dump position relative to the main pivot connections with the spaced apart seat stanchions.

FIG. 18 is a plan view of an upright design position of the variant 196 of seat assembly utilizing the structure of FIGS. 16-17, with FIG. 19 succeeding FIG. 18 and illustrating the seat bottom 26 in a forward/downward most displaced position and the linkage connected seatback 14' in a forward rotated dump position relative to the main pivot connections with the spaced apart seat stanchions (see also corresponding dump positions of variant 10 (FIG. 2) and variant 68 (FIG. 8).

Figure 20:
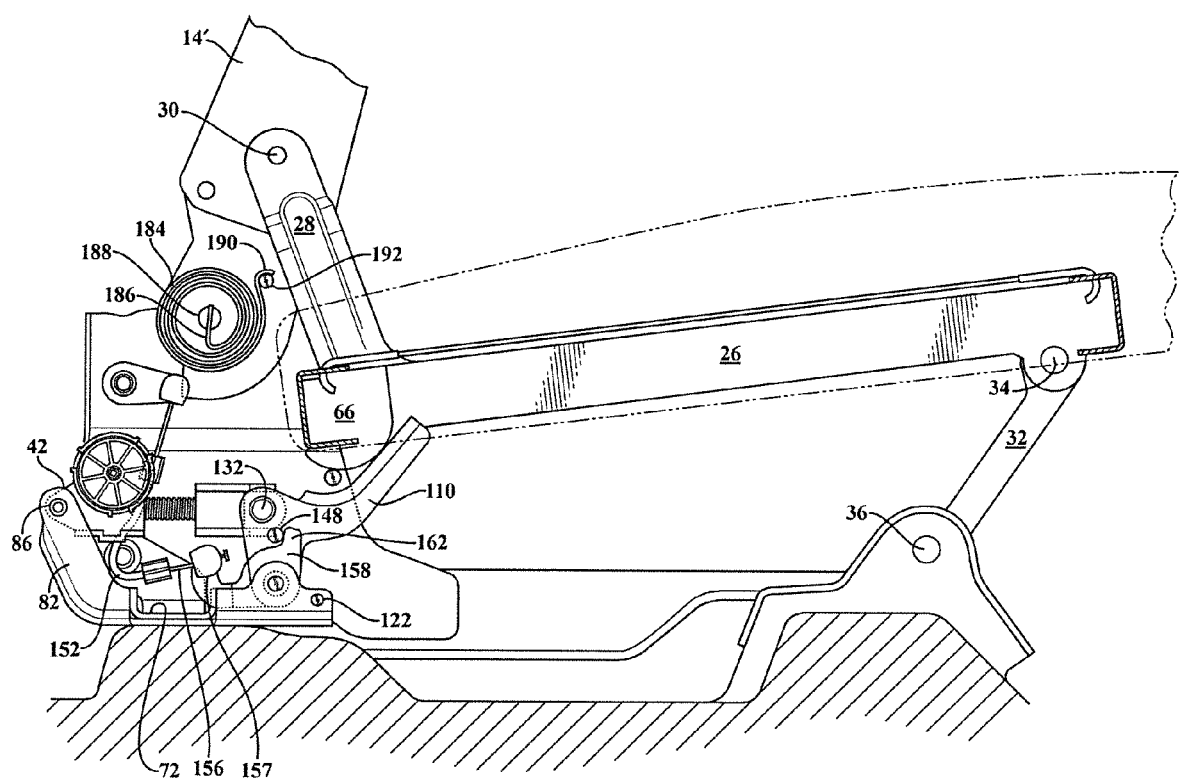
FIG. 20 is a succeeding view to FIG. 19 illustrating the seat assembly and motor driven linkage in an intermediate upright rewind position.
Figure 21:
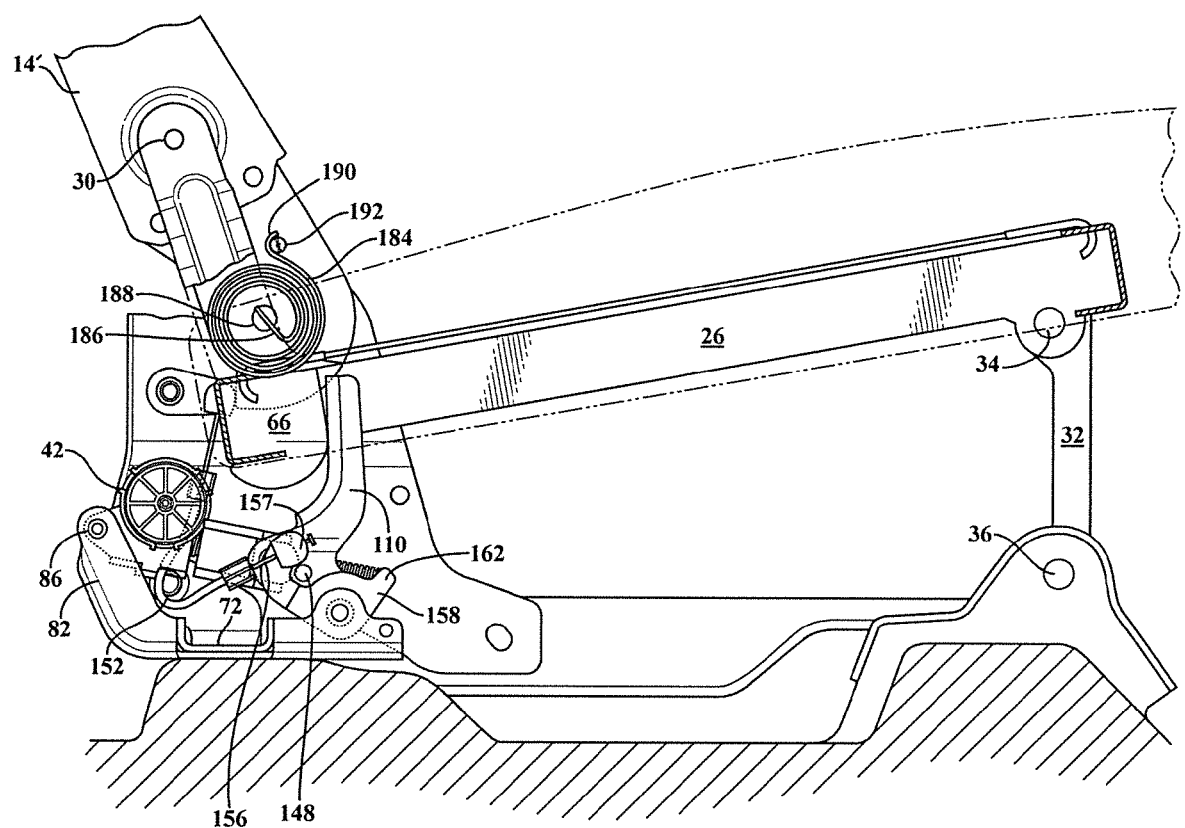
FIG. 21 is a further upright return and design position prior to resetting of the motor and linkage supporting arm.

FIG. 20 is a succeeding view to FIG. 19, and illustrating the seat assembly and motor driven linkage in an intermediate upright rewind position. Finally, FIG. 21 is a further upright return and design position prior to resetting of the motor and linkage supporting arm.

Having described my invention, other additional preferred embodiments will become apparent to those skilled in the art to which it pertains, and without deviating from the scope of the appended claims.

The invention claimed is:

1. A seat assembly, comprising:
   a pair of stanchions secured to floor locations of a vehicle interior;
   a seatback pivotally secured between said stanchions;
   a seat bottom having an arm extending therefrom which is pivotally engaged to said seatback at a location offset from said seatback pivot with said stanchions, said seat bottom also pivotally connected at forward locations by a pair of second linkages extending to additional floor locations such that pivoting of said seatback results in slaved pivoting and combined displacement of said seat bottom between upright design and forward folded positions;
   a motor pivotally secured to the vehicle interior, a rotatable screw extending from said motor and supporting an interiorly threaded collar in length displaceable fashion along said screw; and
   a support arm pivotally secured to the vehicle interior at a first location and to said screw supported collar at a second location, said support arm responding to actuation of said motor in at least a rewind direction in order to upwardly displace said seat bottom and seatback to the upright design position.

2. The seat assembly as described in claim 1, further comprising a clock spring for biasing said seatback to the forward folded position, a lever engaging said seatback in the upright design position and, upon being displaced out of engagement, causing said seatback and seat bottom to rotate to the forward folded position.

3. The seat assembly as described in claim 2, further comprising a cable extending between a first end in communication with said support arm and a second end in engagement with said lever, pivoting of said support arm causing displacement of said cable to disengage said lever from seat seatback.

4. The seat assembly as described in claim 3, further comprising a pawl rotatably supported upon a further floor location and engaging said second end of said cable, a pin extending from a location of said support arm and, upon said motor pivoting said support arm, said pin engaging a pivotally offset location of said pawl in order to displace said cable.

5. The seat assembly as described in claim 4, said pawl further comprising a triangular shaped body having an arcuate inner channel seating said pin.

6. The seat assembly as described in claim 4, said pawl further comprising an exterior arcuate surface along which is guided said pin from a first ledge surface triggering said seatback release.

7. The seat assembly as described in claim 1, further comprising a linkage connecting said support arm to said seat bottom during displacement of said seat bottom between the upright design and forward folded positions.

8. The seat assembly as described in claim 4, further comprising a floor support plate extending underneath said seat bottom and between said stanchions and pivotally supporting at least one of said motor and pawl.

9. The seat assembly as described in claim 8, said floor support plate further comprising a primary support plate exhibiting an elongated and width extending body having a "U" shape in profile, said primary support plate seating upon a crosswise extending secondary support plate to which each of said motor and pawl are pivotally supported.

10. The seat assembly as described in claim 2, said seatback further comprising a pair of seatback arms in coaxially and pivotally secured fashion to said stanchions defining a floor mount for a vehicle seat, said extending arms defining sides of a seatback frame supporting a seatback cushion.

11. The seat assembly as described in claim 10, at least one of said seatback arms further comprising an arcuate bottom profile terminating at a first edge configured ledge which contacts at least one pin extending from an outboard location of one of said stanchions in the upright design position, said bottom profile terminating at an opposite end in a second edge configured ledge defining a rotationally offset stop location upon contacting said pin.

12. The seat assembly as described in claim 1, said seat bottom further comprising a pair of side members defining part of a seat bottom frame and supporting a seat bottom cushion.

13. The seat assembly as described in claim 1, said arm further comprising a first pair of extending linkage arms extending between pivotally inter-connecting locations above said seatback relative to a stanchion pivot, and extending to rear ends of said seat bottom.

14. The seat assembly as described in claim 1, said support arm further comprising a generally elongated and irregular shape with an upwardly facing contact surface a distance from said pivotal support location with said stanchion.

15. The seat assembly as described in claim 14, further comprising a three dimensional disk shaped contact element secured to a rear edge of said seat bottom side and exhibiting a configured bottom surface engaged by said contact surface of said pivotal support arm.

16. The seat assembly as described in claim 8, further comprising an obstruction sensor incorporated into said motor for reversing a driving direction, such as in the event of an obstruction being detected during resetting to the upright design position.

17. A seat assembly, comprising:
- a pair of stanchions secured to floor locations of a vehicle interior;
- a seatback pivotally secured between said stanchions;
- a seat bottom having an arm extending therefrom which is pivotally engaged to said seatback at a location offset from said seatback pivot with said stanchions, said seat bottom also pivotally connected at forward locations by a pair of second linkages extending to additional floor locations such that pivoting of said seatback results in slaved pivoting and combined displacement of said seat bottom between upright design and forward folded positions;
- a clock spring for biasing said seatback to the forward folded position, a lever engaging said seatback in the upright design position and, upon being displaced out of engagement, causing said seatback and seat bottom to rotate to the forward folded position;
- a motor pivotally secured to a floor plate which in turn mounted upon the floor of the vehicle between said stanchions and underneath said seat bottom, a rotatable screw extending from said motor and supporting an interiorly threaded collar in length displaceable fashion along said screw;
- a support arm pivotally secured to the vehicle interior at a first location and to said screw supported collar at a second location, said support arm having an upwardly facing contact surface a distance from said pivotal support location with said stanchion; and
- a cable extending between a first end in communication with said support arm and a second end in engagement with said lever, pivoting of said support arm causing displacement of said cable to disengage said lever from said seatback, a pawl rotatably supported upon a further floor location and engaging said second end of said cable, a pin extending from a location of said support arm and, upon said motor pivoting said support arm, said pin engaging a pivotally offset location of said pawl in order to displace said cable, upon cable triggered release of said seatback to said forward dump position, said support arm responding to actuation of said motor in a rewind direction in order to upwardly displace said seat bottom and slaved seatback to the upright design position.

18. The seat assembly as described in claim 17, said pawl further comprising a triangular shaped body having an arcuate inner channel seating said pin.

19. The seat assembly as described in claim 17, said pawl further comprising an exterior arcuate surface along which is guided said pin from a first ledge surface triggering said seatback release.

20. A seat assembly, comprising:
- a pair of stanchions secured to floor locations of a vehicle interior;
- a seatback pivotally secured between said stanchions;
- a seat bottom having an arm extending therefrom which is pivotally engaged to said seatback at a location offset from said seatback pivot with said stanchions, said seat bottom also pivotally connected at forward locations by a pair of second linkages extending to additional floor locations such that pivoting of said seatback results in slaved pivoting and combined displacement of said seat bottom between upright design and forward folded positions;
- a motor pivotally secured to a floor plate which in turn mounted upon the floor of the vehicle between said stanchions and underneath said seat bottom, a rotatable screw extending from said motor and supporting an interiorly threaded collar in length displaceable fashion along said screw; and
- a support arm pivotally secured to the vehicle interior at a first location and to said screw supported collar at a second location, said support arm having a linkage connecting said support arm to said seat bottom during displacement of said seat bottom between the upright design and forward folded positions in response to actuation of said motor.

* * * * *